Sept. 7, 1965　　　J. F. OLAGNIER ET AL　　　3,204,681

ANTI-SPLASH TIRES FOR FAST ROLLING AIRCRAFT

Filed Nov. 12, 1964　　　　　　　　　　2 Sheets-Sheet 1

INVENTORS
JEAN FRANCIS OLAGNIER
PIERRE FRANCOIS MARIE JOSEPH JOLIVET
BY

*ATTORNEY.*

Sept. 7, 1965  J. F. OLAGNIER ET AL  3,204,681
ANTI-SPLASH TIRES FOR FAST ROLLING AIRCRAFT
Filed Nov. 12, 1964  2 Sheets-Sheet 2

INVENTORS
JEAN FRANCIS OLAGNIER
PIERRE FRANCOIS MARIE JOSEPH JOLIVET
BY
ATTORNEY.

United States Patent Office 3,204,681
Patented Sept. 7, 1965

3,204,681
ANTI-SPLASH TIRES FOR FAST ROLLING AIRCRAFT
Jean Francis Olagnier, Levallois, and Pierre Francois Marie Joseph Jolivet, Colombes, France, assignors to Societe anonyme dite: Pneumatiques, Caoutchouc Manufacture et Plastiques Kleber Colombes, Colombes, France
Filed Nov. 12, 1964, Ser. No. 410,445
Claims priority, application France, June 1, 1960, 828,995
6 Claims. (Cl. 152—154)

The present invention relates to high speed tires and, in particular, to tires used on jet aircraft which travel on the ground at speeds exceeding 100 kilometers per hour. This application is a continuation-in-part of our prior application Serial No. 113,168, filed May 29, 1961.

When a jet aircraft, which is landing or taking off at a very high speed, travels through a puddle of water, the tires produce splashes which are capable of seriously prejudicing the movement of the aircraft, particularly when these splashes are able to reach the jet engines. Splashing of water by the tires is particularly hazardous for aircraft whose motors are not axially separated from the undercarriage, for example, aircraft in which the jet engines are positioned against the fuselage, or small military aircraft, the engines of which are located very near to the wing root. In such aircraft, splashing is especially to be feared during takeoff since it can cause reduced thrust of the jet engines or complete flame-out.

In order to avoid splashes from an automobile tire it has already been proposed to provide it with rubber discs extending perpendicularly to the axis of the tire on the side walls thereof. A tire of this type is disclosed in French Patent No. 797,617 as having a vertically directed flexible circular band on each side with the edge of each band located almost at the running surface of the tread. This tire is intended for use on automobiles to direct lateral splashes of water back towards the ground in order that other vehicles and pedestrians are not soiled. Tire constructions of this type have not been successful in preventing splashes and are subject to being damaged by contact with the road. They, therefore, cannot be used on aircraft which land and take off at high speed.

Another solution to the problem of splashing by automobile tires has been proposed in French Patent No. 903,690. The tire construction proposed therein has grooves of rounded shape on each edge of the tread in order to direct the splashing water back towards the ground and thereby avoid lateral projection of water. This arrangement cannot be efficiently used on aircraft tires because the latter are subjected to very heavy loads causing such deformation of the tire in the zone of contact with the ground that the surfaces of the grooves located on either side of the tread are positioned substantially in the plane of the surface of contact with the ground so that such grooves are no longer effective to prevent splashing. Even if the tire is highly inflated in order to reduce the flattening of the portion of the tire in contact with the ground (a practice which is harmful in other respects for the tire and for the aircraft itself, since the tire becomes very hard) the tread edge grooves remain very close to the ground and, hence, are substantially ineffective to prevent splashing when they are submerged in puddles of water having depths common on runways. In such a case, the water is splashed upwards tangentially to the sides of the tire just as if the grooves did not exist.

It should be evident from the foregoing considerations that the problem of preventing splash by the tires of high speed jet aircraft presents substantially different conditions than those involved in the case of automobile tires, and that the proposals of prior inventors in the automobile tire art do not teach a satisfactory solution of the problem as applied to aircraft tires.

The principal object of the invention is to provide an improved tire, designed especially for jet powered aircraft that travel on the ground at high speed, so constructed so as to prevent water being splashed upwards at an angle such as to reach the jet engines or other vital portions of the aircraft. This is achieved by providing at least one side wall of the tire with an integral annular rib of substantially triangular cross section projecting laterally from the tire side wall, the rib being spaced from the tread of the tire by a distance such that said rib does not contact the ground when the tire is in use.

The improved tire has a cross section of greater width than height, and the rib is preferably positioned so that the distance between its radially outer surface and the crown of the tread is between one-half and one-third of the total height of the section of the tire in the state of rest and when not subject to load. Thus, the rib is located a substantial distance radially inwardly of the tire from the ground contacting surface thereof. The projection of the rib with respect to the side wall is preferably between $\frac{1}{20}$ and $\frac{1}{6}$ of the width of the tire in its unloaded state. For presently employed aircraft tires, this corresponds to a dimension of about 10 to 35 millimeters. The rib is preferably molded as an integral part of the tire and may be made of natural or synthetic rubber without any reinforcement. When the rib has to undergo considerable forces, it may be reinforced with one or more layers of fabric to insure against it being torn off the tire.

In order that the present invention may be more readily understood, reference is now made, by way of example, to the accompanying drawings, forming a part of this application, in which.

Figure 1:
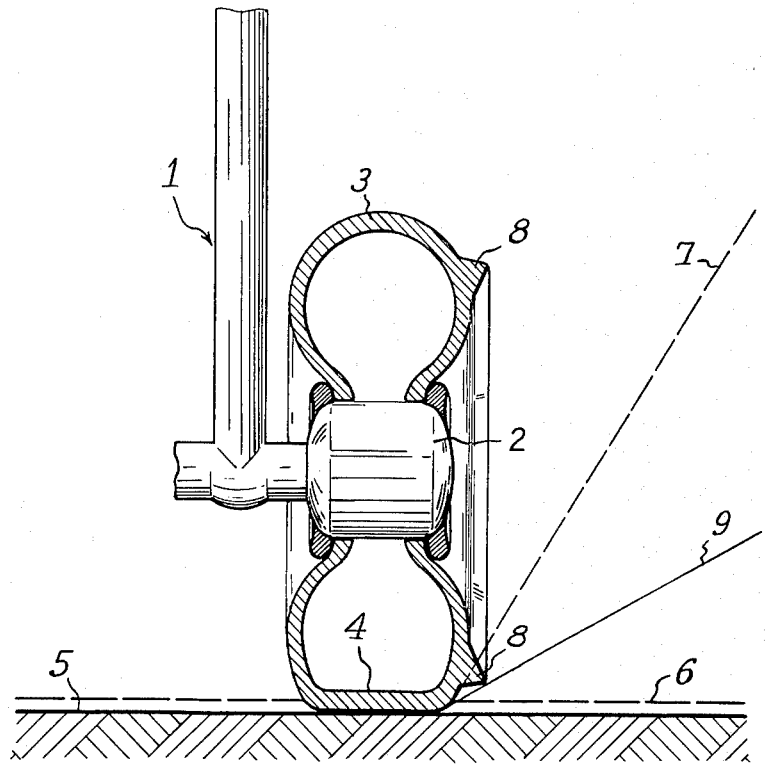
FIGURE 1 is a schematic, sectional view through one embodiment of a tire according to the present invention, the tire being shown inflated, loaded and in contact with the earth.

FIGURE 1 of the drawings diagrammatically shows a member 1 of the undercarriage of an aircraft with a hub 2, upon which is mounted a tire 3. The tire 3 is flattened, as indicated at 4, on the ground 5 under the weight of the aircraft. The dotted line 6 represents the level of a puddle of water into which the tire is just about to run. If the tire had a normal outline, water would be splashed upwardly with the upper edge of the splash being roughly along the dotted line 7, which is shown in FIG. 1 as extending at an angle relative to the ground of about 58°. However, according to the invention, the tire is provided with an annular rib 8 projecting laterally from the side wall of the tire and extending around the tire at a position spaced radially inwardly from the trend. This position is selected so that, when the tire is flattened under the weight of the aircraft, the lower or radially outer surfaces $8_1$ of the rib 8 remains at a certain distance above the ground, i.e. about 2 to 3 centimeters.

Figure 2:
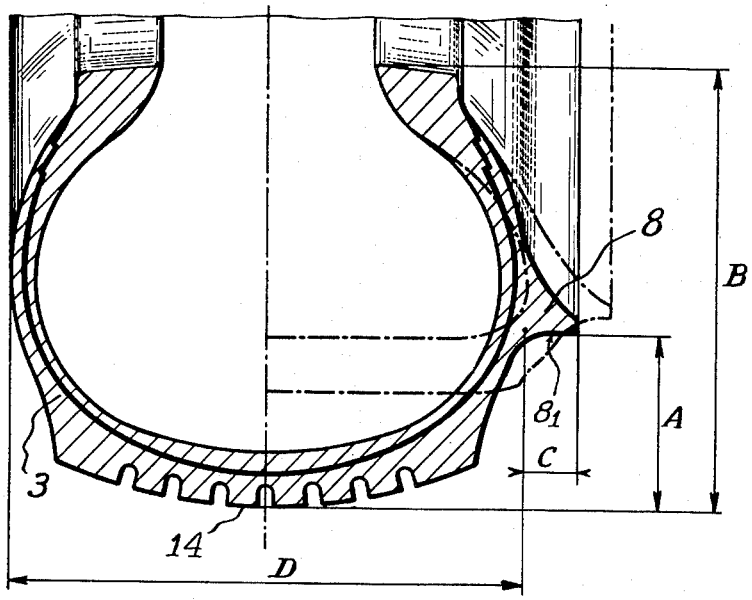
FIGURE 2 is a section through the tire of FIGURE 1, in its unloaded state and to a larger scale.

As can be seen in FIGURE 2, the distance A between the radially outer surface $8_1$ of the rib 8 and the crown of the tread 14 is between approximately one-third and one-half the total height B of the tire section when the tire is at rest and not loaded. When the rib is so positioned, the radially outer surface of the rib 8 remains at a sufficient height above the ground to be above the level of the usual puddles, even when the tire is flattened on the ground under the effect of the supported load, the tire then taking on the shape shown in broken lines in FIGURE 2.

The rib 8 may be placed on only one side wall or on both side walls depending on whether the splashes of water can be harmful on the corresponding sides of the tire. Due to the presence of this rib on the side wall of the tire, water cannot splash upwardly beyond the angle represented by the straight line 9 in FIGURE 1. Thus it is possible to limit the upward direction of water splashes, upon the passage of the tire through puddles, by several tens of degrees. This is very important in order to avoid water being splashed on the jet engine with the serious consequences that this may have.

The rib 8 preferably has an almost triangular shape in cross section with one side thereof being the tire side wall. The base of the triangle, formed by the surface $8_1$, is preferably of frusto-conical shape of small inclined angle so that it extends generally axially of the tire with the minimum diameter of this surface adjacent its outer edge. This surface of the rib is, therefore, slightly inclined towards the axis of the tire and has an arcuate concave portion adjacent the tire in order that it may progressively blend into the tire side wall. The other side or radially inner surface of the rib has a concave curvature of radius such as to smoothly merge with the tire side wall at a location spaced from the inner edge of surface $8_1$ by a distance which is at least as great as the distance C of the outer edge of the rib from the side wall. With reference to FIG. 2, it will be seen that the distance C is measured horizontally from the outer edge of the rib to the tire carcass per se at its maximum lateral dimension when the tire is not subject to load.

The relationship between the distance the axially outer edge of the surface $8_1$ on rib 8 projects from the side wall and the distance that edge is above the ground when the tire is under load determines the angle of splash when the tire runs through water of depths less than those which submerge the rib. These dimensions are so related that the straight line 9 drawn from the said outer edge of the surface $8_1$ to the adjacent ground contacting portion of the tread is sufficiently inclined to the horizontal to prevent sensitive parts, such as jet engines, from being splashed. The angularity of line 9, as shown in FIG. 1, is approximately 30°. Had line 9, however, been drawn from the same origin as line 7, its angularity relative to the surface of the ground 5 would be in the neighborhood of 35°. Although the angularity of the line 9 which defines the upper boundary of the splashing liquid is established by the position of the outer edge of the surface $8_1$, the entire radially outer surface $8_1$ of the rib 8, including the portion adjacent the side wall, is effective in deflecting the splashing liquid.

In order to obtain the desired result, the distance C that the rib 8 extends from the side wall of the tire is an important factor. The greater the extension the lesser the angle of splash, with the upper limit being that at which the rib no longer has sufficient resistance to being torn off when in use. The preferred amount of the extension can be expressed by a relationship between the distance C and the width D of the tire, this relationship being such that C is between $\frac{1}{20}$ and $\frac{1}{6}$ of the width D. For presently employed aircraft tires, the minimum extension should not be less than about 10 millimeters and the maximum extension is about 35 millimeters.

The rib 8 must be able to resist the action of centrifugal force, which tends to cause it to bend outwards and thus move against the side wall of the tire. The stress to which the rib is subjected by centrifugal force can be very great since the tire is intended for use on aircraft which take off and land at a very high speed. The triangular cross-sectional shape of the rib gives it the requisite resistance to centrifugal force, and, together with the location of the rib on the tire side wall, ensures that the rib remains substantially undeformed even when the tire as a whole has been materially deformed by high speed operation under loaded condition.

Figure 3:
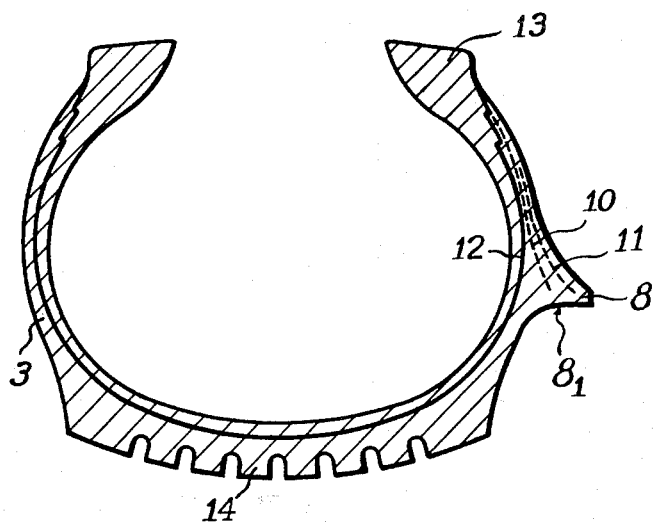
FIGURE 3 is a section through another embodiment of a tire incorporating the invention.

When it is desired still further to increase the resistance of the rib against deformation and against being torn off, the rib is reinforced by incorporating therein one or more layers of fabric which may be of the weftless type constituted by textile or metal cables. FIGURE 3 shows a tire according to the invention in which the rib 8, similar to that shown in FIGURE 2, is reinforced with layers of fabric 10, 11. These layers have their radially inner edges applied against the outer plies 12 of the carcass of the tire and they extend nearly to the bead 13. The layers 10 and 11 are thus practically joined to the carcass 12. The radially outer edges of the layers 10 and 11 are separated from each other and the layers extend to the center of the rib 8 and terminate at a short distance from the surface $8_1$ of the rib. It is obvious that the arrangement of the layers 10 and 11 can be modified, as also can the number and extent of those layers, according to the degree of resistance which it is desired to obtain.

Tests made upon tires equipped with splash deflecting ribs at different spacings from the running surface have shown the importance of having that spacing A, in FIGURE 2, in the order of one-third to one-half of the cross-sectional height B of the tire when unloaded. This is especially important for high speed aircraft tires which undergo deflection in the order of 30% when under load. Under such a condition ribs placed on or extending adjacent to the tread shoulder region of the tire, at a distance from the running surface less than one-third of the cross-sectional height of the tire, are substantially in contact with the ground or so close thereto during operation of the aircraft that they are ineffectual to prevent splashing and, instead, actually accentuate it. Thus, when the rib has a portion thereof adjacent the running surface of the tire under operating conditions, the rib itself strikes the surface of the water puddles through which the tire is run. In such a case there are splashes both forwardly and laterally of the tire at angles to the horizontal which are in the order of those when the tire has no laterally projecting ribs. When the rib is spaced from the running surface a distance greater than one-half the cross-sectional height of the tire, the lateral extent of the rib necessary to prevent high angle splashing, equivalent to that caused by a conventional tire without the rib, is far in excess of that which can withstand the stresses of high speed operation or be accommodated in the region provided for retraction of the wheels during flight.

The spacing of the surface $8_1$ of rib 8 from the crown of the tire a distance in the order of one-third to one-half of the cross-sectional height of the tire ensures that a rib of lateral extent in the order of 10 to 35 mm., and hence such that it can be accommodated in the space into which the wheels are retracted in flight, will remain a distance in the order of 2 to 3 cm. above ground level when the tire is in loaded contact therewith. This is a sufficient height for effective splash deflecting action on runways for jet powered aircraft. It is also important that the surface $8_1$ of the rib extend without circumferential interruptions and generally parallel to the rotational axis of the tire or inclined at a small angle towards that axis. The triangular cross-sectional shape of the rib permits these requirements for the surface $8_1$ to be maintained during operation of the tire by providing the requisite support so that the rib is not deformed by centrifugal force nor distorted into an ineffectual configuration by flexing of the tire.

Having thus described the invention, we claim:
1. An inflatable tire for use on aircraft which take-off and land at high speed and have engines mounted in locations subject to contact by tire-splashed liquid during take-off and landing through puddles, the said tire comprising a generally toroidally shaped carcass, the unloaded cross-sectional width of which is greater than its height, at least one side wall of said tire having a laterally pro- jecting annular rib integrally molded thereon concentric with the axis of rotation of the tire, the said rib being substantially triangular in cross section with the radially outer surface of the rib circumferentially smoothly continuous and extending generally parallel to the rotational axis of the tire when the tire is under load, the outer edge of said radially outer rib surface being spaced radially from the rolling surface of the tire a distance between one-third and one-half of the sectional height of the tire in its unloaded condition, and the said outer edge of the radially outer rib surface projecting axially beyond the maximum lateral extent of the tire carcass a distance in the order of one-twentieth to one-sixth of the cross-sectional width of the unloaded tire, whereby the said rib is effective to deflect tire-splashed liquid at an angle not greater than 35° relative to the ground surface.

2. A tire as defined in claim 1 wherein the said radially outer surface of the rib is frusto-conical in shape with the minimum diameter of the rib adjacent its axially outer edge.

3. A tire as defined in claim 1 wherein the said outer edge of the radially outer surface of the rib is spaced a distance in the range of 10 to 35 millimeters from the adjacent side wall of the tire when the tire is in unloaded condition.

4. A tire as defined in claim 1 wherein the entire said radially outer surface of the rib is spaced above the rolling surface of the tire a distance in the range of 2 to 3 centimeters when the tire is inflated and supporting an aircraft.

5. An inflatable tire for use on aircraft which take off and land at high speed and have engines mounted in locations subject to contact by tire-splashed liquid during take-off and landing through puddles, the said tire comprising a generally toroidally shaped carcass, the unloaded cross-sectional width of which is greater than its height, at least one side of said tire having a laterally projecting rib integrally molded thereon concentric with the axis of rotation of the tire, the said rib being substantially triangular in cross section with the radially outer surface of the rib of frusto-conical configuration with a small included angle so that the said surface is circumferentially smoothly continuous and generally parallel to the axis of rotation of the tire when the tire is under load, the outer edge of the said radially outer surface of the rib being spaced radially from the tire rolling surface a distance between one-third and one-half of the sectional height of the tire in its unloaded condition and a distance in the order of 2 to 3 centimeters when the tire is inflated and supporting an aircraft, the said outer edge of the radially outer rib surface projecting axially beyond the maximum lateral extent of the tire carcass a distance in the order of one-twentieth to one-sixth of the cross-sectional width of the unloaded tire with the last-mentioned distance being not less than 10 millimeters nor more than 35 millimeters, whereby the said rib is effective to deflect tire-splashed liquid at an angle not greater than 35° relative to the ground surface.

6. In an aircraft tire having a carcass provided with at least one reinforcing ply, a rib of substantially triangular cross section molded integrally with one side wall of the tire and extending around the tire concentric with its axis of rotation, said rib projecting generally axially from said side wall by a distance of about 10 to 35 millimeters and being spaced from the tread of the tire, the distance between the surface of said rib adjacent the tread of the tire and the crown of said tread being between one-half and one-third the total height of the tire section, and a reinforcing material for said rib comprising superimposed layers of fabric having their radially inner edges applied to the outer ply of the carcass adjacent the tire bead and their radially outer edges extending to the center of the rib where the said outer edges are mutually separated.

References Cited by the Examiner
FOREIGN PATENTS 250,541 10/26 Italy.
568,712 12/23 France.
597,343 8/25 France.

ARTHUR L. LA POINT, *Primary Examiner.*